United States Patent Office 3,000,648
Patented Sept. 19, 1961

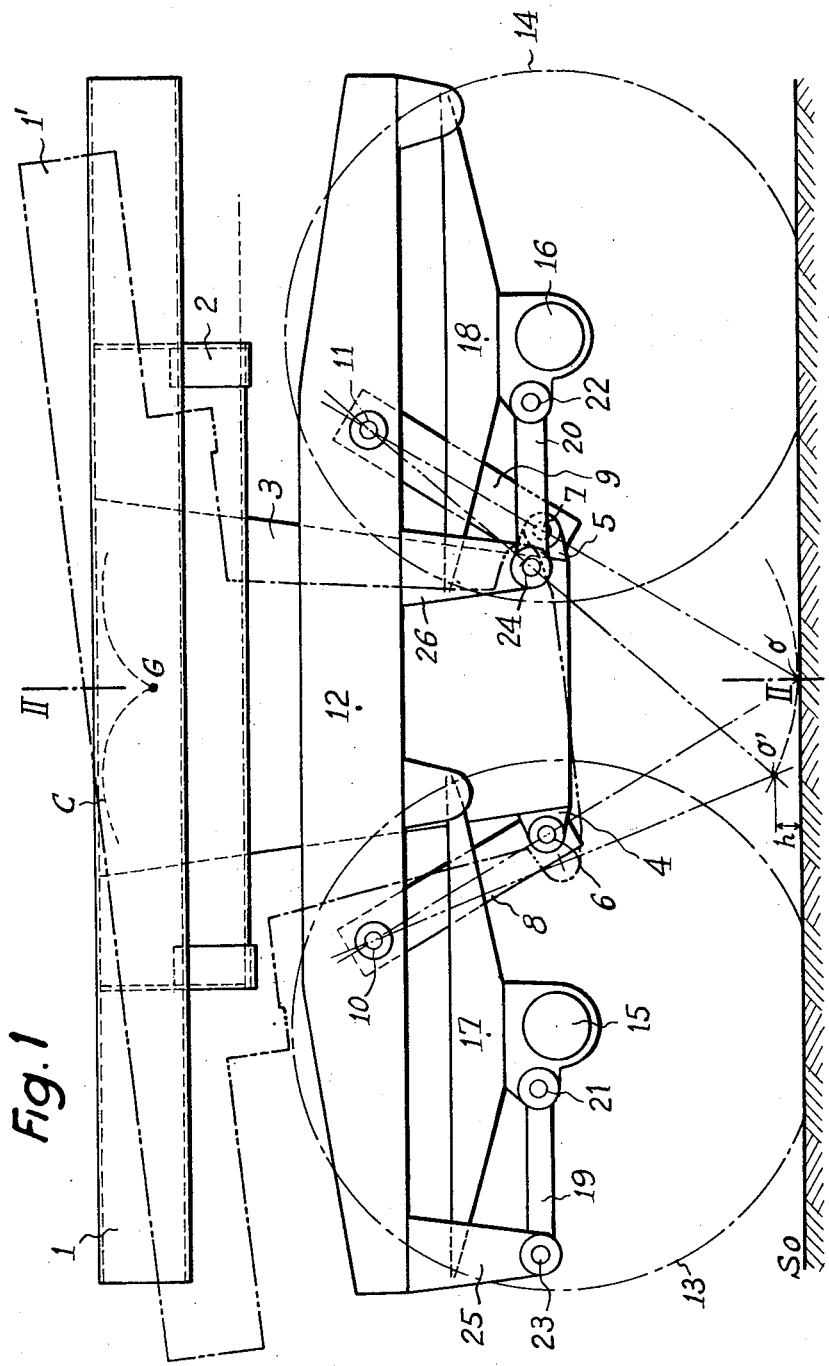

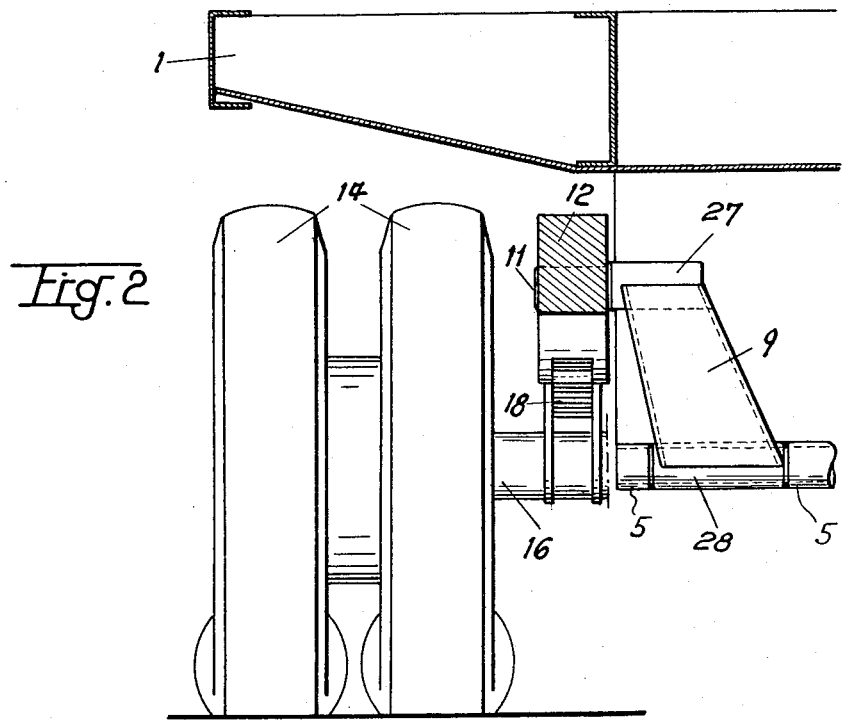

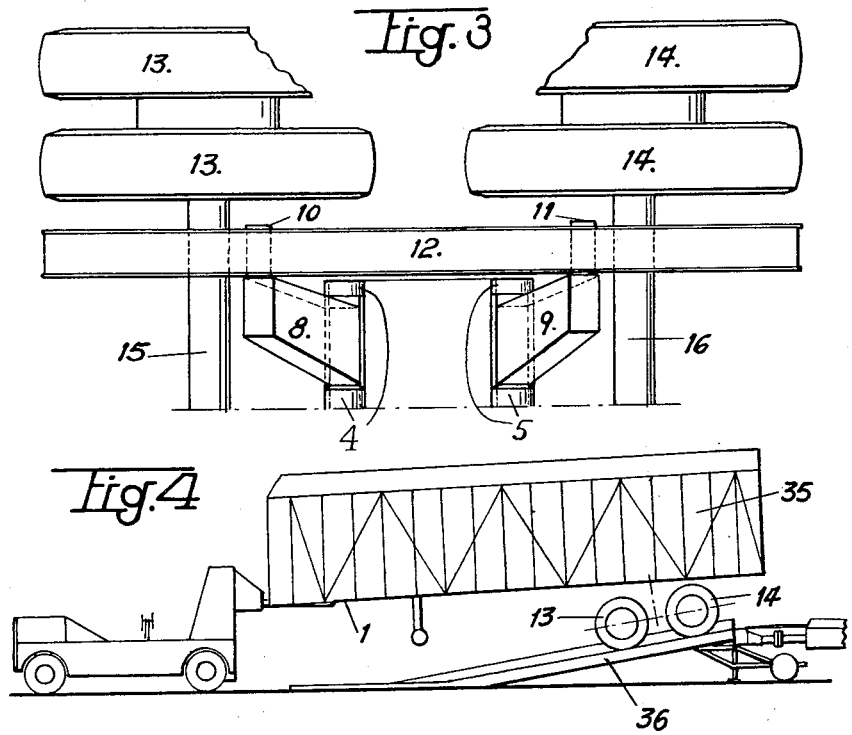

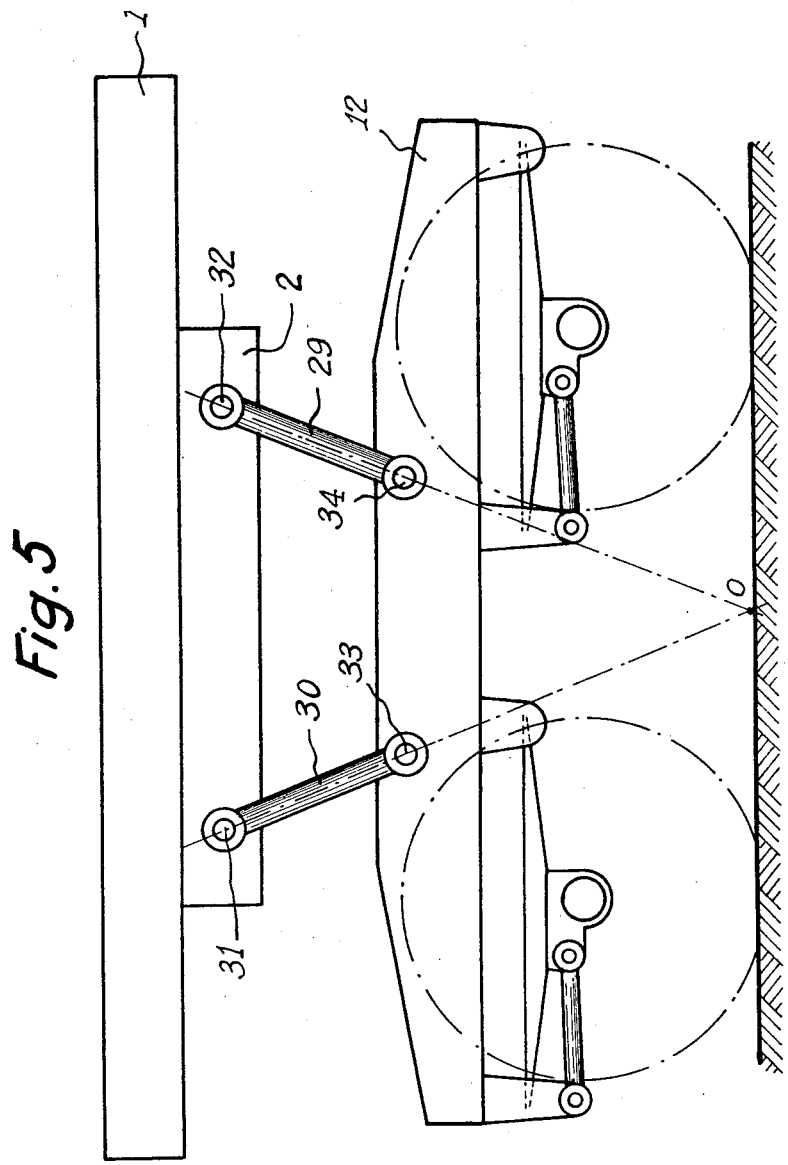

3,000,648
SUPPORTING STRUCTURE FOR THE CHASSIS
OF A ROLLING VEHICLE
André Buisson, Paris, France, assignor to Societe Lorraine des Anciens Etablissements de Dietrich et Cie
de Luneville, Paris, France, a French company
Filed Jan. 27, 1959, Ser. No. 789,448
Claims priority, application France Jan. 29, 1958
9 Claims. (Cl. 280—104.5)

This invention relates to vehicles, specifically to vehicles of the type including at least one pair of longitudinally spaced wheel axles in the form of a bogie truck. One class of vehicle so constructed is that of semi-trailers, where such bogie truck is positioned near the rear end of the vehicle frame or chassis. While the invention has particular applicability to such semi-trailer vehicles, it is to be understood that it is by no means restricted thereto.

In the supporting structure for vehicles of the specified type problems are encountered in connection with the distribution of loads between the two twin axles of the bogie truck, both in connection with static loads and with the dynamic loads developed during braking and starting.

In one type of structure heretofore used, each axle is suspended at each end of it from the center of a laminated suspension spring, the outer or remote ends of both springs being attached to brackets depending from the chassis while the inner adjacent ends of the springs are coupled to the ends of a common balance lever. In another type of conventional structure, the axles are spring-suspended at the rear and front ends of a platform which in turn is suspended at its center from the vehicle chassis.

Both conventional types of structure just mentioned are satisfactory as concerns the balanced distribution of static loads between the axles, but do not operate well in the presence of braking forces. Even when strictly equal braking forces are applied to the sets of wheel on both axles, in the first system referred to, the front axle tends to lift while simultaneously the balance lever tends to force the rear axle correspondingly downward. In the second system mentioned above, the braking resistance applied to the tires at ground level tends to rock the platform forwardly thereby relieving the rear axle and increasing the load on the front axle.

In all cases uneven load distribution during application of the brakes results in a number of serious drawbacks. The actual total braking force is less than the predetermined theoretical value and the reduction is unpredictable and uncontrollable. Further, the braking action on the particle axle that is momentarily relieved of load tends to be discontinuous resulting in "brake chatter." And the tires wear unevenly.

In an attempt to eliminate the above difficulties involving uneven braking load distribution between the axles of a bogie truck, a construction has been proposed wherein the front ends of the laminated suspension springs with which the axles are connected are directly attached to the vehicle chassis, while the rear ends of said springs are attached to the front and rear ends of a platform pivoted at its center to the chassis. With such an arrangement, the brake force applied to both sets of wheel tires tends to rock both pairs of suspension springs upwardly about their points of attachment to the chassis, so that provided the braking forces are equal the variations in load on both axle will cancel each other and the system will remain balanced. In such a construction both the static load distribution and the braking load distribution are taken care of in a substantially satisfactory manner. However other difficulties are now encountered. First, the range of relative tilt angles that can be imparted to the plane containing both axles relatively to the normal horizontal plane of the chassis is very limited, so that even for relatively small variation from horizontal, for example a 7% grade, detrimental slipping and jamming effects are liable to occur at the points of connection of the suspension springs with the tilting platform. This is an especially serious drawback in connection with a semi-trailer which may have to be hauled over a grade of up to 15% or more or where the front end of the semi-trailer is required to be rested on the ground.

An additional drawback of the last-mentioned supporting arrangement is that in the case of even slight inequality between the braking forces applied to the twin axles, compensation between the variations in the load applied to the two axles is no longer present and that axle on which the braking load is higher tends to be lifted off the ground.

It is an object of this invention to provide supporting structure for a vehicle including a bogie truck of the kind specified above, (a) wherein load distribution between the two axles of the truck will be effectively and uniformly ensured both as regards static loading and loads due to application of braking and starting force, thereby permitting a substantial range of tilt angles between the vehicle chassis and the plane of the wheel axles, and (b) wherein substantial differences between the forces applied to both wheel axles can be taken up without affecting the balanced distribution of loads between the axles.

A basic concept underlying this invention is the well-known principle of dynamics that where a pivotally displaceable structure is concerned, any force applied to the structure through the center of pivotal displacement thereof will develop zero moment and hence will not tend to displace the structure. Starting with this idea it is apparent that if both wheel axles of a bogie truck or the like are to be supported from a common carrier frame, pivotally connected to the main vehicle frame (herein called the chassis), then in order to prevent any tendency to relative pivotal displacement between the carrier frame and chassis under the effect of a braking force applied in a direction lying on the horizontal plane of the ground, it would be necessary for the chassis and carrier frame to be pivoted to one another about a pivotal axis lying on the plane of the ground. Obviously this condition is practically impossible to meet using a physical pivotal axis connecting the chassis and carrier frame. The invention, therefore, can be said to reside in the use of linkage so connecting the vehicle chassis with the bogie-truck carrier frame that relative movements between the chassis and frame will be equivalent to elementary rotations about a momentary center of rotation positioned substantially at ground level in a normally loaded condition of the vehicle.

Thus an important feature of the invention is the provision of a pair of longitudinally spaced axles having wheels thereon, carrier frame means bodily supporting both said axles from a chassis, and a linkage interconnecting said chassis and carrier frame for relative movement about a momentary virtual axis of rotation positioned substantially at ground level in a normally loaded condition of the vehicle.

It should be realized in this connection that while it has already been proposed heretofore to provide the pivotal axis between a vehicle chassis and a bogie truck at as low an elevation as possible, in such prior constructions to the best of our knowledge the pivotal center between the chassis and frame was invariably an actual pivot or shaft; hence it was definitely impossible with any such system to achieve the beneficial results of the invention which rely entirely on the fact that said pivotal center is positioned at ground level; such condition of course can only be achieved when the pivotal center is a momentary virtual axis of rotation in the geometrical or kinematic sense of this term being provided as the virtual intersection of the extended center line of links in a manner to be further described in detail.

FIG. 1 is a simplified side view of a two-axle suspension system according to an exemplary embodiment of the invention, FIG. 2 is a fragmentary elevational section view on line II—II of FIG. 1;

FIG. 3 is a fragmentary plan view with the main vehicle frame removed; and

FIG. 4 is a smaller-scale showing of a semi-trailer vehicle constructed according to the invention being drawn by a tractor down a steep grade.

FIG. 5 is a side elevation view similar to FIG. 1, but of a modification.

Referring to FIG. 1, reference 1 designates a platform constituting the main frame or chassis of a semi-trailer. The platform is reinforced in an intermediate part of it overlying the two axles with an under-frame 2. Further a box-like portion 3 projects downwardly from the central part of the chassis into the space between the axles.

Projecting from the sides of the box 3 at the lower end of it and on each side of the vehicle are a pair of clevis-like brackets 4 and 5 in which respective shafts 6 and 7 are pivoted about axes transverse to the vehicle. Secured to the shafts 6 and 7 and projecting upward and outward therefrom between the arms of the clevises 4 and 5, are lever arms 8 and 9 respectively. The upper outer ends of the arms 8 and 9 are pivoted by way of the journals 10 and 11 to spaced points of a side carrier member 12 which is mounted below the frame 1 but above the shafts 6 and 7, and is adapted to rock as will presently appear. It will be understood that the arrangement just described is provided on each side, i.e. left and right, of the vehicle, only the arrangement on one side being visible on each of FIGS. 1 and 2.

It will be apparent that the spacing between the journals 10 and 11 is substantially greater than the spacing between the axes of shafts 6 and 7 so that there is in effect provided a deformable quadrilateral which in its normal undeformed position shown in FIG. 1 is a trapezoid having horizontal opposite sides and having downwardly converging lateral sides defined by the arms 8 and 9 which if extended would intersect at a point O. The arrangement is such that this geometric point O is normally positioned substantially at ground level with due allowance for the normal sag of the tires 13 and 14 under load. Further, the arrangement is symmetrical so that the point O is equally spaced from the ground-engaging areas of the tires as is visible from FIG. 1, thereby ensuring that the wheels are statically balanced.

The wheel axles 15 and 16 each having a pair of wheels 13 and 14 respectively journalled on them, are conventionally supported from brackets depending from the centers of respective leaf spring laminations 17 and 18. The ends of the respective laminations are in turn pivoted to bosses or brackets depending from spaced points of the carrier member 12 as will be clear from FIG. 1.

Pivoted at 21 and 22 to the supporting brackets of axles 15 and 16 and laterally with respect to said axles on the same side thereof (either both forwardly or both rearwardly thereof) are reaction links 19 and 20, which project horizontally and have their free ends pivoted at 23 and 24 to brackets 25 and 26 depending from suitable points of the member 12.

As will appear more clearly from FIGS. 2 and 3, the two carrier members 12 are symmetrically displaced outwardly from, and extend alongside, the sides of the chassis box member 3. It will also be seen that the crank arms 8 and 9 are tapered members having their upper ends pivoted by means of sleeve 27 upon the journals 10 and 11, and their lower ends pivoted by means of sleeve 28 upon the shafts 6 and 7 as previously noted.

It will be clear that in the case of small-amplitude relative displacements of the vehicle frame 1 about the normal position shown, with respect to the road surface So, or with respect to the member 12 which remains substantially parallel to such surface, such small-amplitude displacements can be assimilated with elementary rotations about a momentary axis of rotation at the point O. However, in case of larger relative displacements of the frame 1 consequent on relatively large angles of rotation of the crank arms 8 and 9, whereby the frame 1 assumes a tilted position as indicated in chain lines at 1' in FIG. 1, the momentary axis of rotation is shifted from point O to a point O' determined as the virtual intersection of the center-lines of arms 8 and 9 in their displaced position.

It is demonstrable by analysis that the locus of the momentary axis of rotation is a sixth order curve to which the ground plane So is tangent at the point O.

It will be seen therefore that in the horizontal condition of the vehicle frame 1, any braking force applied to either one or both of the wheel axles 15 and 16 will not exert any moment tending to rock the member 12. This is evident since the braking force is applied along a line passing through the momentary axis of rotation O. It is further seen that even in the case of substantially large displacements of the frame such as shown at 1', the moment applied by the braking force will still remain extremely small, since such moment will at all times be proportional to the distance indicated at h in FIG. 1, which distance remains very small owing to the geometric nature of the locus of the center of rotation adjacent the mean position O thereof.

The following considerations further show that the equilibrium position of the suspension in the neutral condition shown is a stable one. The centre of gravity of the vehicle has been arbitrarily indicated in FIG. 1 as positioned at the point G. On deformation of the quadrilateral system 8—9—12, it can readily be shown by calculus that the locus of the center of gravity is of the general form shown by curve C, with two symmetrical branches rising forward and rearward from the mean point G. Due to this shape of the c.g. locus, whereby on relative tilting of the vehicle chassis the c.g. rises rather than drops it is evident that such tilting will produce an increase in the potential energy of the vehicle in terms of the force of gravity and that the potential energy thus stored will then tend to restore the vehicle chassis to its normal centered position in which the center of gravity is lowermost. This proves the stable character of the equilibrium involved.

Various modifications may be made in the single embodiment illustrated and described without departing from the scope of the invention. Thus, the construction involving the downwardly extending bow-like frame structure 3 is by no means essential to the invention. In the modified form of the invention shown in FIG. 5, the diverging links 29 and 30 are connected to the axes 31 and 32 of the chassis 2 and to the axes 33 and 34 of the longitudinal members 12'. In this modification, the center lines of the links 29 and 30 come together at a point O below them at the surface of the ground, or in other words in the plane of rolling engagement of the wheels.

The main difference between FIGURE 5 and FIGURES 1–3 is that the links 8 and 9 in FIGURES 1–3 extend downwardly from the carrier member 12 whilst in FIGURE 5, the links 29 and 30 (equivalent to links 8 and 9) extend upwardly from carrier member 12'.

In both instances, the links connect to the chassis, but in FIGURES 1–3, the connection is to the bottom part of the downward box-like extension 3 from the chassis and is below the carrier 12 instead of above, as in FIGURE 5.

Further, it is contemplated according to the invention, that both wheel axles such as 15 and 16 need not necessarily be equally loaded, but may be arranged to have different loads applied to them. In such case, it would simply be necessary to modify the structure illustrated in such a manner that the momentary rotation axis O as defined by the intersection of links 8 and 9 will be displaced toward one or the other axle so that the relative distances thereof from the respective ground-engaging areas of the wheels will be proportional to the relative load distribution between the two axles.

In the arrangements described, the suspension springs 17 and 18 form integral parts of the pivotal structure and participate in the deformations thereof, rather than forming parts of the interconnecting pivotal system. Hence dynamic impact stresses applied to the springs, which are unpredictable and difficult to control, will not affect the position of the momentary axis of rotation O nor will they disturb the operation of the system.

In FIG. 4, there is shown, as an example, a semi-trailer 35 placed on an inclined ramp 36. It can be seen that the articulated suspension of the invention enables the wheels 13 and 14 to be maintained in contact with the plane of rolling 36, even when the platform 1 of the semi-trailer makes a considerable angle in the neighborhood of 18° with the plane of rolling.

This invention is applicable to other kinds of vehicle than the semi-trailer type shown by way of illustration. In fact its applicability is not restricted to road vehicles, but can be usefully extended to the bogie trucks of railway vehicles; and this is true regardless of whether the bogie trucks are power driven so that the system will have to take up draft force in addition to braking force, or are idle so that only braking forces are involved.

I claim:

1. A vehicle comprising a chassis, a frame positioned generally below said chassis and movable relative thereto, a pair of spaced axles supported from said frame, wheels journalled on said axles, and a deformable linkage on each side of the vehicle parallel to the wheels and interconnecting said chassis and frame, said linkage being constructed and arranged to cause said relative movement between the chassis and frame to be effected substantially about a momentary virtual axis of rotation positioned transverse to the plane of the wheels and substantially in the plane of rolling engagement of said wheels.

2. A vehicle comprising a chassis, a frame positioned generally below said chassis and movable relative thereto, a pair of spaced axles supported from said frame, wheels journalled on said axles, and a pair of links on each side of the vehicle parallel to the wheels and having respective ends pivoted to said frame and chassis, the center line connecting the pivots of one link converging toward the center line connecting the pivots of the other link to intersect at a point positioned substantially in the plane of rolling engagement of said wheels whereby relative movement between the frame and chassis is substantially effected about said point as a virtual axis of rotation.

3. A vehicle comprising a chassis, a pair of longitudinal frame members extending along the sides of the chassis, a portion of said chassis projecting downwardly to a point below said frame members, a pair of longitudinally spaced axles supported below said frame members, wheels journalled on said axles, and a pair of links on each side of the vehicle having upper points pivoted to said respective frame members and lower points pivoted to respective sides of said projecting chassis portion, the center line connecting the pivot points of one link converging downwardly to intersect at a virtual axis of the other link center line connecting the pivot point of the other link at a virtual axis substantially level with the plane of rolling of said wheels to constitute a virtual axis of rotation for relative movement between said frame members and chassis.

4. In a vehicle, a chassis, a pair of longitudinal frame members extending along sides of the chassis, said chassis including a portion projecting downwardly to a point below said frame members, suspension springs attached to said frame members and a pair of longitudinally spaced axles connected to said suspension springs to be resiliently suspended from said frame members through said springs, wheels journalled on said axles, and two pairs of links one on each side of the vehicle and having upper points pivoted to said respective frame members and lower points pivoted to respective sides of said projecting chassis portion, the center line connecting the pivot points of one link of each pair converging downwardly to intersect the center line connecting the pivot points of the other link of that pair at a virtual axis substantially level with the plane of rolling of said wheels to constitute a virtual axis of rotation for relative movement between said frame members and chassis.

5. In a vehicle, a chassis, a pair of longitudinally spaced axles having wheels thereon, carrier means bodily supporting said axles, and linkage means movable in a longitudinal plane and interconnecting said chassis and carrier means for relative movement about a virtual axis of rotation positioned substantially at ground level.

6. In a vehicle, a chassis, a pair of longitudinally spaced axles having wheels thereon, carrier means bodily supporting said axles, and at least a pair of links having first points pivoted to said chassis and second points pivoted to the carrier means, the center line connecting the first and second points of one link intersecting the center line connecting the first and second points of the other link of said pair at a virtual axis substantially at ground level to provide a virtual axis of rotation for relative movement between the chassis and carrier means.

7. In a vehicle, a chassis, a pair of longitudinally spaced axles having wheels thereon, a pair of transversely spaced carrier members supporting said axles, and pairs of links having upper points pivoted to said carrier members and lower points pivoted to said chassis, the center line connecting the upper and lower points of one link intersecting with the center line connecting the upper and lower points of the other link at a point substantially in the plane of rolling of said wheels to provide a virtual axis of rotation for relative movement between the chassis and carrier members.

8. In a vehicle, a chassis, a pair of longitudinally spaced axles having wheels thereon, a pair of transversely spaced carrier members having said axles spring-suspended therefrom, and two pairs of links one pair at each side of the vehicle, each link having an upper point pivoted to a related carrier member and a lower point pivoted to said chassis, the center lines of both links in each pair intersecting at a point substantially at ground level to provide a virtual axis of rotation for relative movement between the chassis and carrier members.

9. In the combination claimed in claim 4, further links having points pivoted to said axles and other points pivoted to said frame members to take up dynamic reaction from said springs.

References Cited in the file of this patent
UNITED STATES PATENTS

| | | |
|---|---|---|
| 1,771,488 | Duesler | July 29, 1930 |
| 2,144,112 | Ingildsen | Jan. 17, 1939 |
| 2,188,654 | Favary | Jan. 30, 1940 |
| 2,287,314 | Kroll | June 23, 1942 |